(12) United States Patent
Iwase

(10) Patent No.: US 11,657,367 B2
(45) Date of Patent: May 23, 2023

(54) WORKFLOW SUPPORT APPARATUS, WORKFLOW SUPPORT SYSTEM, AND NON-TRANSITORY COMPUTER READABLE MEDIUM STORING PROGRAM

(71) Applicant: FUJIFILM Business Innovation Corp., Tokyo (JP)

(72) Inventor: Kazuhisa Iwase, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 439 days.

(21) Appl. No.: 16/790,764

(22) Filed: Feb. 14, 2020

(65) Prior Publication Data

US 2021/0064863 A1 Mar. 4, 2021

(30) Foreign Application Priority Data

Aug. 28, 2019 (JP) .............................. JP2019-155624

(51) Int. Cl.
| | | |
|---|---|---|
| *G06Q 10/10* | (2023.01) | |
| *G06V 30/413* | (2022.01) | |
| *G06V 30/414* | (2022.01) | |
| *G06V 30/416* | (2022.01) | |
| *G06V 10/778* | (2022.01) | |
| *G06F 18/21* | (2023.01) | |
| *G06V 10/75* | (2022.01) | |

(52) U.S. Cl.
CPC .......... *G06Q 10/10* (2013.01); *G06F 18/217* (2023.01); *G06V 10/75* (2022.01); *G06V 10/778* (2022.01); *G06V 30/413* (2022.01); *G06V 30/414* (2022.01); *G06V 30/416* (2022.01)

(58) Field of Classification Search
CPC .. G06V 30/413; G06V 30/414; G06V 30/416; G06V 10/776; G06V 10/75; G06V 10/778; G06K 9/6262; G06F 18/217; G06Q 10/10
See application file for complete search history.

(56) References Cited

U.S. PATENT DOCUMENTS

| | | | | |
|---|---|---|---|---|
| 7,734,554 B2* | 6/2010 | Simske | ................... | G06F 16/93 |
| | | | | 706/20 |
| 11,017,221 B2* | 5/2021 | Freed | ................... | G06V 30/416 |
| 2012/0117082 A1* | 5/2012 | Koperda | ........... | G06F 16/24578 |
| | | | | 707/E17.084 |
| 2019/0370540 A1* | 12/2019 | Freed | ................... | G06V 30/416 |

FOREIGN PATENT DOCUMENTS

| | | |
|---|---|---|
| JP | 2006-243830 | 9/2006 |
| JP | 2010-198430 | 9/2010 |

OTHER PUBLICATIONS

Hien (Recognition of Invoices from Scanned Documents), pp. 71-78. (Year: 2017).*

* cited by examiner

*Primary Examiner* — Daniel G Mariam
(74) *Attorney, Agent, or Firm* — JCIPRNET

(57) ABSTRACT

A workflow support apparatus includes a classification section that classifies a document included in an original document from image data acquired by reading the original document, and a workflow searching section that searches for a workflow to which the document is to be attached, from the document classified by the classification section.

16 Claims, 19 Drawing Sheets

FIG. 4A

DELIVERY NOTE

TO

PERSON IN CHARGE:

SUBJECT: [x x x]

AS FOLLOWS ......

DELIVERY No.: [x x x x]
DELIVERY DATE: [x x x]
○○ CORPORATION
〒 1-2-3 SHINJUKU, SHINJUKU
SHINJUKU 1ST BUILDING
TEL:
FAX:
E-Mail:
IN CHARGE:

DUE DATE: SEPARATE CONSULTATION
PAYMENT CONDITION: THE END OF THE MONTH BALANCING, THE FOLLOWING MONTH PAYMENT

TOTAL AMOUNT OF MONEY: ¥0 (INCLUDING TAX) SUMMARY

| No. | QUANTITY | UNIT PRICE | AMOUNT OF MONEY |
|-----|----------|------------|-----------------|
|     |          |            |                 |
|     |          |            |                 |
|     |          |            |                 |

STATEMENT

DELIVERY No. x x x x

CHARACTERISTIC WORD PARAMETER

| INFORMATION OF EXTRACTION TEXT STRING | CONDITION |
|---|---|
| TEXT SIZE | WITHIN SECOND |
| TEXT COLOR | OTHER THAN BLACK |
| ... | ... |

FIG. 7

BY EXAMPLE OF "IMAGE ANALYSIS RESULT"

| page No. | EXTRACTION TEXT STRING | TEXT SIZE | TEXT COLOR |
|---|---|---|---|
| 1 | TRANSMITTAL LETTER | 20 | BLACK |
| 1 | JANUARY 1, 2019 | 10 | BLACK |
| 1 | x x CORPORATION | 10 | BLACK |
| 1 | FUJI TARO | 16 | BLACK |
| 2 | RECEIPT | 20 | BLACK |
| 2 | x x CORPORATION | 10 | GREEN |
| 2 | RECEIPT NUMBER | 8 | GREEN |
| 2 | 12345678 | 8 | BLACK |
| 2 | RECEPTION DATE | 8 | BLACK |
| ... | ... | | |

EXAMPLE OF CHARACTERISTIC WORD EXTRACTION RESULT

| page No. | CHARACTERISTIC WORD | TEXT SIZE | TEXT COLOR |
|---|---|---|---|
| 1 | TRANSMITTAL LETTER | 20 | BLACK |
| 1 | FUJI TARO | 16 | BLACK |
| 2 | RECEIPT | 20 | BLACK |
| 2 | x x CORPORATION | 10 | GREEN |
| 2 | RECEIPT NUMBER | 8 | GREEN |

FIG. 8

CLASSIFICATION DICTIONARY

| KEYWORD | DOCUMENT CLASSIFICATION CANDIDATE PAGE |
|---|---|
| RECEIPT, | MAIN DOCUMENT |
| BILL, invoice | MAIN DOCUMENT |
| DELIVERY NOTE, DELIVERY FORM | MAIN DOCUMENT |
| STATEMENT | ANNEXED DOCUMENT |
| TRANSMITTAL LETTER | ANNEXED DOCUMENT |
| SPECIFICATION | ANNEXED DOCUMENT |
| <NONE> | CONTINUATION DOCUMENT |

FIG. 13

EXAMPLE OF DATA MANAGED BY WORKFLOW STORAGE UNIT

| WORKFLOW IDENTIFIER | WORKFLOW NAME | WORKFLOW SEARCH KEYWORD | APPROVER | ACTIVATION CONDITION | OTHERS |
|---|---|---|---|---|---|
| 1 | BILLING PROCESS WORKFLOW | BILL Invoice | SUPERIOR | MAIN DOCUMENT | AMOUNT OF MONEY PROVIDED |
| 2 | RECEPTION PROCESS WORKFLOW | RECEIPT DELIVERY NOTE | SUPERIOR | MAIN DOCUMENT OR ANNEXED DOCUMENT | NAME OF DELIVERED MATTER |
| 3 | APPROVAL WORKFLOW | CONTACT DOCUMENT REPORT | SUPERIOR | MAIN DOCUMENT OR ANNEXED DOCUMENT | |
| 4 | SELECTION WORKFLOW | | | NA | |

FIG. 14

WORKFLOW ACTIVATION SCORE TABLE

| CATEGORY | CONDITION | SCORE |
|---|---|---|
| TEXT SIZE | 20 POINTS OR MORE | 10 |
| | 20 POINTS OR LESS | 5 |
| TEXT COLOR | OTHER THAN BLACK | 7 |
| | BLACK | 5 |
| DOCUMENT CLASSIFICATION | MAIN DOCUMENT | 10 |
| | ANNEXED DOCUMENT | 3 |

FIG. 15

RESULT EXAMPLE

| WORKFLOW IDENTIFIER | SCORE |
|---|---|
| 1 | 25 |
| 2 | 0 |
| 3 | 10 |
| 4 | 5 |

FIG. 19

WORKFLOW ATTACHMENT DOCUMENT WAIT SCREEN

APPLICATION ID: 10000-01

WORKFLOW NAME: BILLING PROCESS WORKFLOW

STATE: OPERATING WAITING

MESSAGE:
THE MAIN DOCUMENT BEING
THE ACTIVATION CONDITION OF
THE BILLING PROCESS
WORKFLOW IS NOT ATTACHED.

ATTACHMENT ADDITION

ATTACHED DOCUMENT: 20190101000101.pdf
20190101000002.pdf

| NAME | VALUE |
|---|---|
| FILE NAME | x x x .pdf |
| OCR FULL TEXT | STATEMENT |
| FILE TYPE | pdf |
| SCANNING DATE AND TIME | 1/1/2019/15:14:33 |

IMAGE DISPLAY
IMAGE DISPLAY

COMPLETE    CANCEL

WORKFLOW SUPPORT APPARATUS, WORKFLOW SUPPORT SYSTEM, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2019-155624 filed Aug. 28, 2019.

BACKGROUND

(i) Technical Field

The present invention relates to a workflow support apparatus, a workflow support system, and a non-transitory computer readable medium storing a program.

(ii) Related Art

JP2006-243830A discloses a workflow support system using an image device, which is a workflow support system in which an image device is used in a support system of a dynamic workflow having a task configuration which dynamically changes. The workflow support system includes at least one of a unit that reads information printed on a paper surface using an image watermarking technology and converting the read information into digital data or a unit that converts information printed on the paper surface into digital data with a text recognition technology. The workflow support system includes a unit that changes a configuration or a state of a workflow by using the digital data.

JP2010-198430A discloses a workflow processing apparatus that processes a workflow selected from a plurality of workflows which have been registered in advance. The workflow processing apparatus includes a control unit that controls a display unit to display at least a log-in screen, a list screen of the workflow, and a search screen of the workflow transitioned from the list screen. The control unit causes one or more workflows searched based on first information including information for identifying a log-in user from the plurality of workflows to be displayed as a default on the list screen, and causes one or more workflows searched based on second information which does not include the information for identifying the log-in user from the plurality of workflows to be displayed as a default on the search screen.

SUMMARY

In the related art, it is known that selection information of a workflow is printed on a recording medium in a form of a QR code (registered trademark), and inserted into a voucher as a cover sheet, and the cover sheet is read out, and thus vouchers are automatically sorted, and the workflow is automatically selected.

The workflow refers to a series of operations in an organization. The voucher refers to a document that proves the establishment of a transaction. In an accounting relationship, the voucher refers to a bill, a delivery note, a receipt, and the like.

Aspects of non-limiting embodiments of the present disclosure relate to a workflow support apparatus, a workflow support system, and a non-transitory computer readable medium storing a program, in which a document of an original document is classified without inserting a recording medium indicating characteristics of the document to the original document, and it is possible to activate a workflow for attaching the document.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a workflow support apparatus including a classification section that classifies a document included in an original document from image data acquired by reading the original document, and a workflow searching section that searches for a workflow to which the document is to be attached, from the document classified by the classification section.

BRIEF DESCRIPTION OF THE DRAWINGS

Exemplary embodiment(s) of the present invention will be described in detail based on the following figures, wherein:

FIGS. 4A and 4B illustrate examples of a voucher used in the workflow support system according to the exemplary embodiment of the invention; FIG. 4A is a plan view illustrating a delivery note; and FIG. 4B is a plan view illustrating a statement.

FIG. 6 is a table illustrating a characteristic word parameter used in a document classifying unit in the workflow support apparatus according to the exemplary embodiment of the invention;

FIG. 7 is a table illustrating an extraction text string and a characteristic word by the workflow support apparatus according to the exemplary embodiment of the invention;

FIG. 8 is a table illustrating a classification dictionary used in the document classifying unit in the workflow support apparatus according to the exemplary embodiment of the invention;

FIG. 13 is a table illustrating a workflow list registered in a workflow storage unit of the workflow support apparatus according to the exemplary embodiment of the invention;

FIG. 14 is a table illustrating a workflow activation score table used in a workflow searching unit of the workflow support apparatus according to the exemplary embodiment of the invention;

FIG. 15 is a table illustrating results obtained by scoring a workflow with the workflow activation score table used in the workflow searching unit of the workflow support apparatus according to the exemplary embodiment of the invention;

FIG. 19 is a screen diagram illustrating a screen output when a pending state occurs in the workflow support apparatus according to the exemplary embodiment of the invention.

DETAILED DESCRIPTION

Hereinafter, an exemplary embodiment of the present invention will be described in detail with reference to the drawings.

Figure 1:
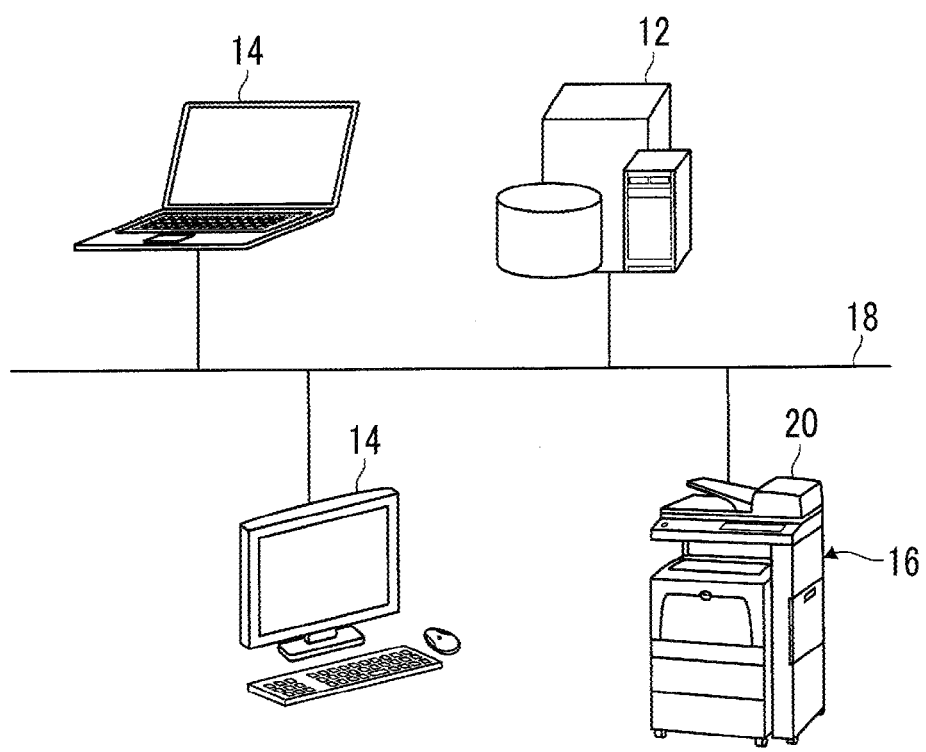
FIG. 1 is a block diagram illustrating an entirety of a workflow support system according to an exemplary embodiment of the invention.

FIG. 1 illustrates the entirety of a workflow support system 10 according to an exemplary embodiment of the invention.

In the workflow support system 10, a server 12, personal computers 14 and 14, and an image forming apparatus 16 constituting the workflow support apparatus are connected to each other via a network 18. The image forming apparatus 16 is a so-called multifunctional device having a printing function, a facsimile function, a scanning function, and the like, and is provided with an image reading device 20 with an automatic document feeder. The network 18 may be a local area network or the Internet.

Figure 2:
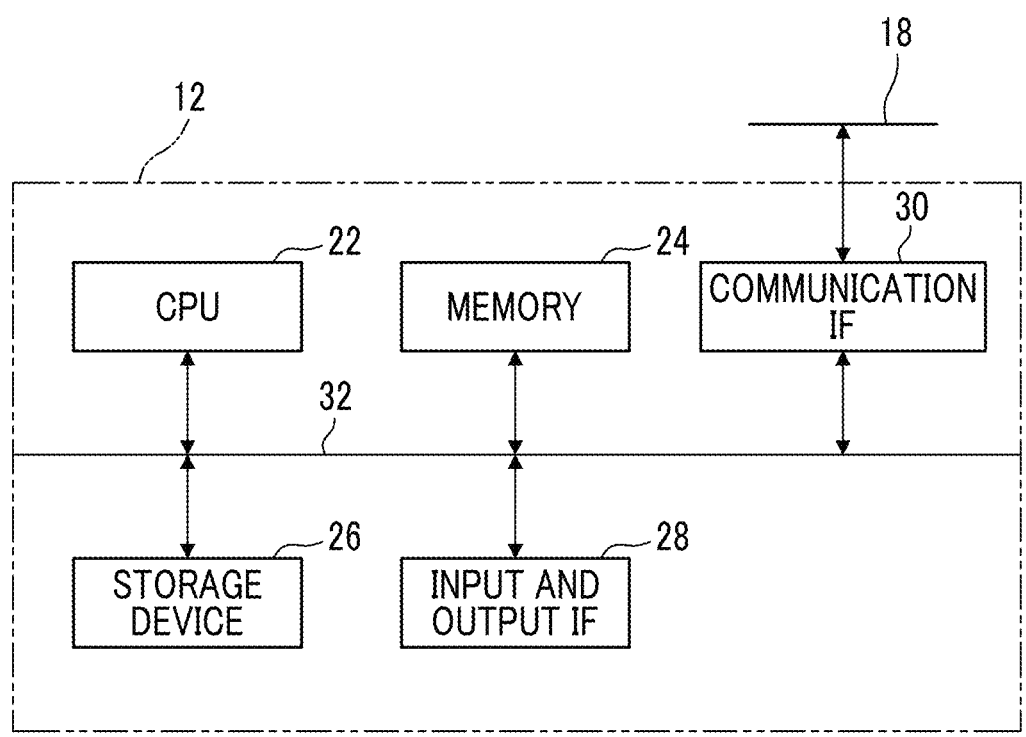
FIG. 2 is a block diagram illustrating hardware of the workflow support apparatus according to the exemplary embodiment of the invention.

FIG. 2 is a block diagram illustrating hardware of the server 12.

The server 12 includes a CPU 22, a memory 24, a storage device 26, an input and output interface 28, and a communication interface 30. The CPU 22, the memory 24, the storage device 26, the input and output interface 24, and the communication interface 30 are connected to each other via a bus 32.

The CPU 22 performs predetermined processing based on a control program stored in the memory 24. The storage device 26 is configured by, for example, a hard disk, and stores necessary software and data. The input and output interface 28 is connected to a display and a keyboard (not illustrated), and inputs and outputs data to and from the display and the keyboard. Data is input and output to and from the communication interface 30 through the above-described network 18.

Figure 3:
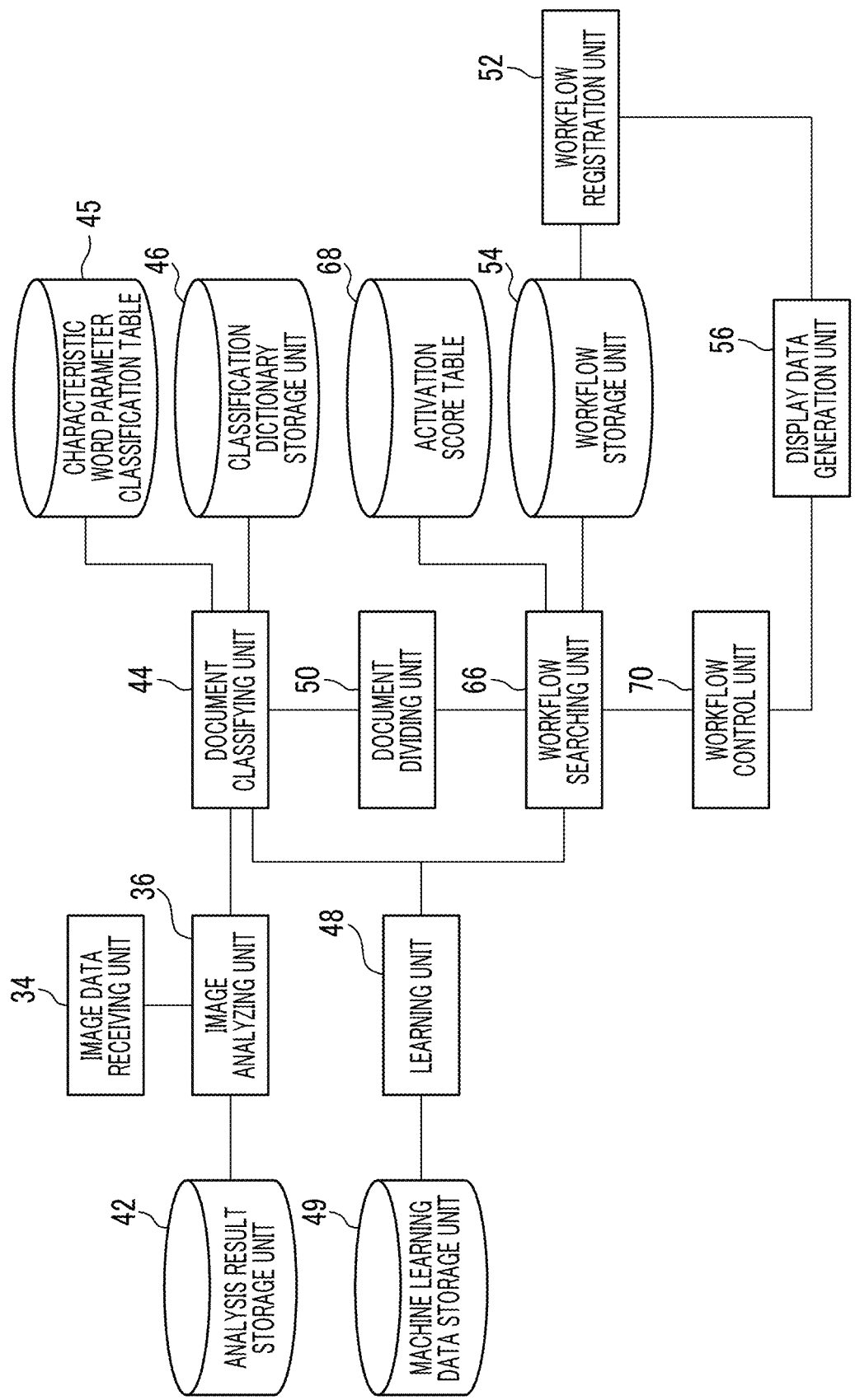
FIG. 3 is a block diagram illustrating functions of the workflow support apparatus according to the exemplary embodiment of the invention.

FIG. 3 is a block diagram illustration functions of the workflow support apparatus according to the exemplary embodiment of the invention.

An image data receiving unit 34 receives an image read by the image reading device 20 in the above-described image forming apparatus 16, for example.

An example of receiving a voucher will be described below.

An image analyzing unit 36 analyzes an image of each page for image data received by the image data receiving unit 34. The image analysis is performed by OCR (which is an abbreviation of an optical character reader and means an optical text reader, but here, this means conversion of image data to text data).

Figure 4B:
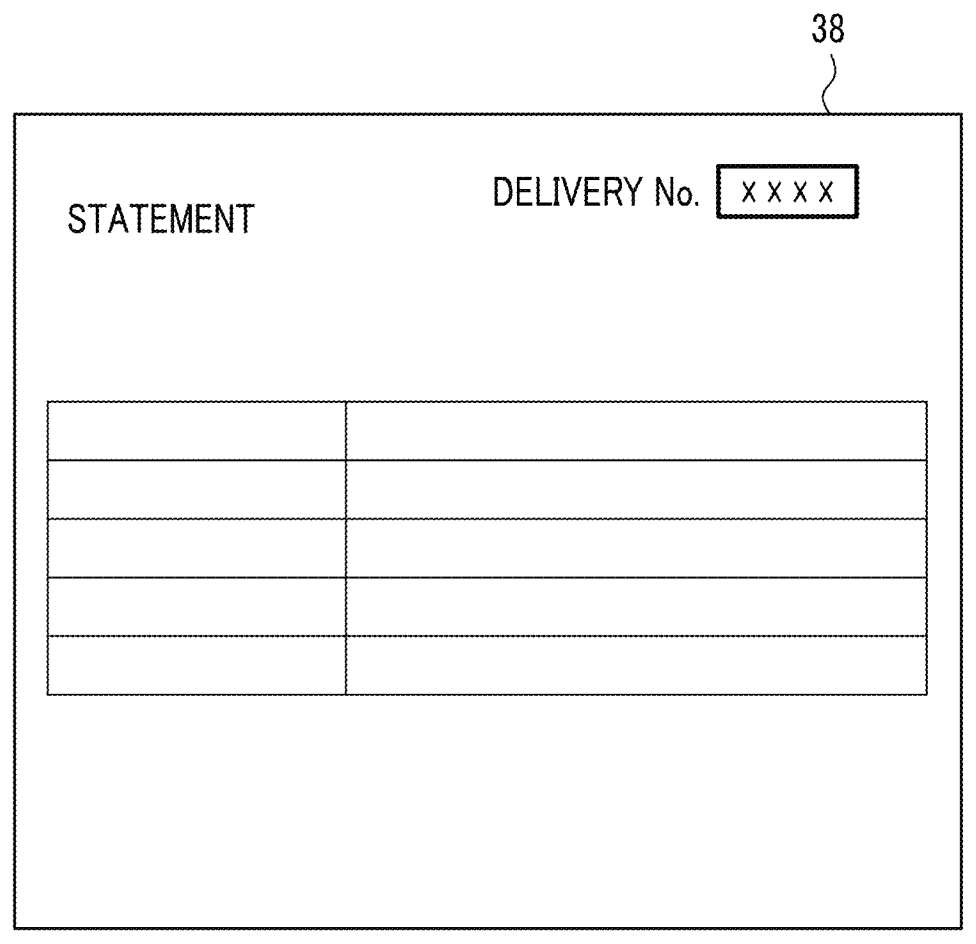

FIGS. 4A and 4B illustrate a delivery note 37 and a statement 38 annexed to the delivery note 37, as examples of a document received by the image data receiving unit 34. In the delivery note 37, a text string "delivery note" is described in the first position line. In addition, a destination, a person in charge, a delivery number, a delivery date, a subject, the name, the address, and the like of a transmitter, the total amount, an abstract of an individual number, a quantity, a unit price, and the like are described in the second and subsequent lines. The descriptions are extracted as text strings by the image analyzing unit 36. In the statement 38, in addition to the description "statement", a delivery number identical to a delivery number of the delivery note is described, and is extracted as a text string by the image analyzing unit 36.

The image analyzing unit 36 performs image analysis on each page to read coordinate positions and text in the image. Adjacent text is recognized as one text string. Rectangular coordinate positions (upper left, lower left, upper right, and lower right) of an extracted text string (referred to as "an extraction text string" below) are extracted. The size and color of the text in the text string may be extracted. The size of the text may be calculated, for example, from the number of characters in the extraction text string, and the width and height by the rectangular coordinates.

Figure 5:
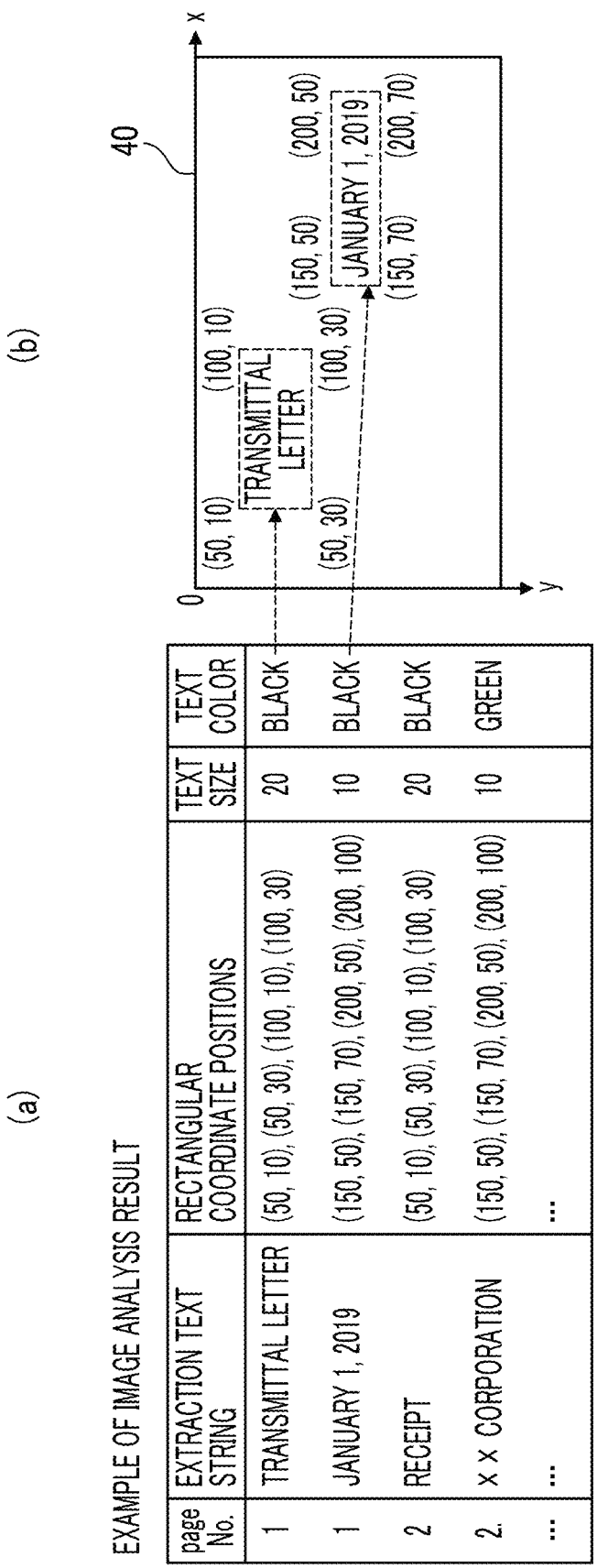
FIG. 5 illustrates an image analysis result in the workflow support apparatus according to the exemplary embodiment of the invention; (a) of FIG. 5 is a table illustrating an analysis result of a transmittal letter; and (b) of FIG. 5 is a plan view illustrating an analysis result of the transmittal letter.

FIG. 5 illustrates an example of a result obtained by analyzing an image. As illustrated in (b) of FIG. 5, for example, a transmittal letter 40 includes text strings of "transmittal letter" and "Jan. 1, 2019". A text recognition result is stored in an analysis result storage unit 42 in a form of a list as illustrated in (a) of FIG. 5. That is, the extraction text string, the rectangular coordinate positions, the text size, and the text color of each of "transmittal letter" and "Jan. 1, 2019" are stored in the analysis result storage unit 42 as an analysis result.

Items extracted by the image analyzing unit 36 may include, for example, a rectangular coordinate position area calculated from the rectangular coordinate positions in addition to the page number, the extraction text string, the rectangular coordinate positions, the text size, and the text color.

The document classifying unit 44 classifies what kind of document each page, based on the text strings analyzed by the image analyzing unit 36. Firstly, the document classifying unit 44 extracts characteristic words with a characteristic word parameter stored in a characteristic word parameter classification table storage unit 45. The characteristic word refers to a text string characterizing a page. The characteristic word parameter refers to a criterion for extracting the characteristic word.

As illustrated in FIG. 6, the characteristic word parameter is set, for example, such that selection conditions in which the text size is within the second in the page, the text color is a color other than black, and the like are set.

A specific example of extracting the characteristic word will be described.

FIG. 7 illustrates an image analysis result in which the first page is a transmittal letter, and the second page is a receipt. In a case where the characteristic word is extracted with the characteristic word parameter illustrated in FIG. 6, a result illustrated in FIG. 7 is obtained. That is, in the first page, "transmittal letter" and "To. FUJI Taro" are extracted with a characteristic word parameter in which the text size is up to the second highest. Other text strings are not extracted since there is no characteristic word satisfying that the text color is a color other than black. In the second page, "receipt" and "xx Corporation" are extracted with the characteristic word parameter in which the text size is up to the second highest, and "receipt number" is extracted with the characteristic word parameter in which the text color is a color other than black.

Then, the document classifying unit 44 determines page break using the extraction result of the characteristic word. The document classifying unit 44 performs classification into a main document, an annexed document, and a continuation document with a classification dictionary stored in a classification dictionary storage unit 46. In the classification dictionary, candidates for classification type corresponding to predetermined classification keywords are defined. For example, as illustrated in FIG. 8, as classification keywords, a receipt, a bill, an invoice, a delivery note, and a delivery form are candidates for the main document. A statement, a transmittal letter, and a specification are candidates for the annexed document. In a case where there is no classification keyword, the document is considered as the continuation document.

The main document is a document becoming the main. The annexed document is a document annexed to the main document. The continuation document is a document following the previous page. Here, the main document candidate and the annexed document candidate are used because the candidates may be changed by subsequent processing.

The document classifying unit 44 determines whether or not the above-described characteristic word is in the classification keyword. In a case where the characteristic word is in the classification keyword, the document classifying unit 44 determines whether the characteristic word is the main document candidate or the annexed document candidate. In a case where the classification keyword is not in the characteristic word, the document is set to be the continuation document.

Figure 9:
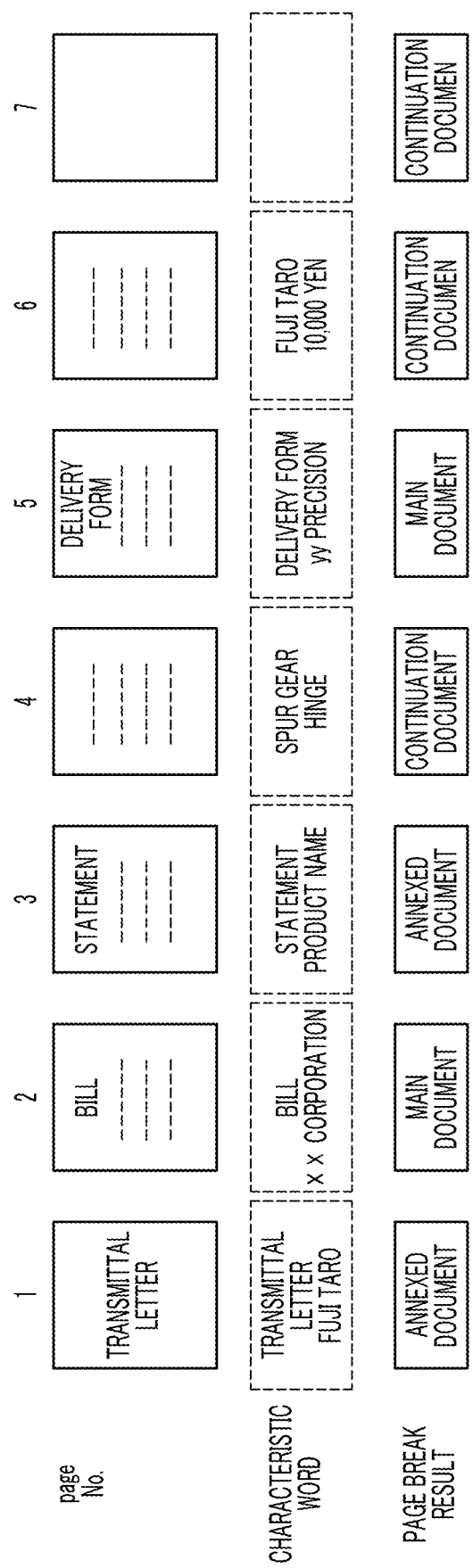
FIG. 9 is a diagram illustrating an example of a document classified by the document classifying unit in the workflow support apparatus according to the exemplary embodiment of the invention.

FIG. 9 illustrates an example in which page break is performed.

In the example, the first page is classified into the "annexed document" because a classification keyword "transmittal letter" in the first page is included in the characteristic word. The second page is classified into the "main document" because a classification keyword "bill" in the second page is included in the characteristic word. The third page is classified into "annexed document" because a classification keyword "statement" in the third page is included in the characteristic word. The fourth page is classified into the "continuation document" because no classification keyword in the fourth page is included in the characteristic word. The fifth page is classified into the "main document" because a classification keyword "receipt" in the fifth page is included in the characteristic word. The sixth page is classified into the "continuation document" because no classification keyword in the sixth page is included in the characteristic word. The seventh page is classified into the "continuation document" identically because no classification keyword in the seventh page is included in the characteristic word.

In the exemplary embodiment, the classification dictionary is used for classifying documents with the predetermined classification keywords, but the documents may be classified by machine learning. That is, learning unit 48 may be connected to the document classifying unit 44. The learning unit 48 may receive an input of a characteristic word, accumulate types of documents for characteristic words in a machine learning data storage unit 49 by using a result of document classification as teacher data, and determine the type of document by the characteristic word from the accumulated pieces of data.

Figure 10:
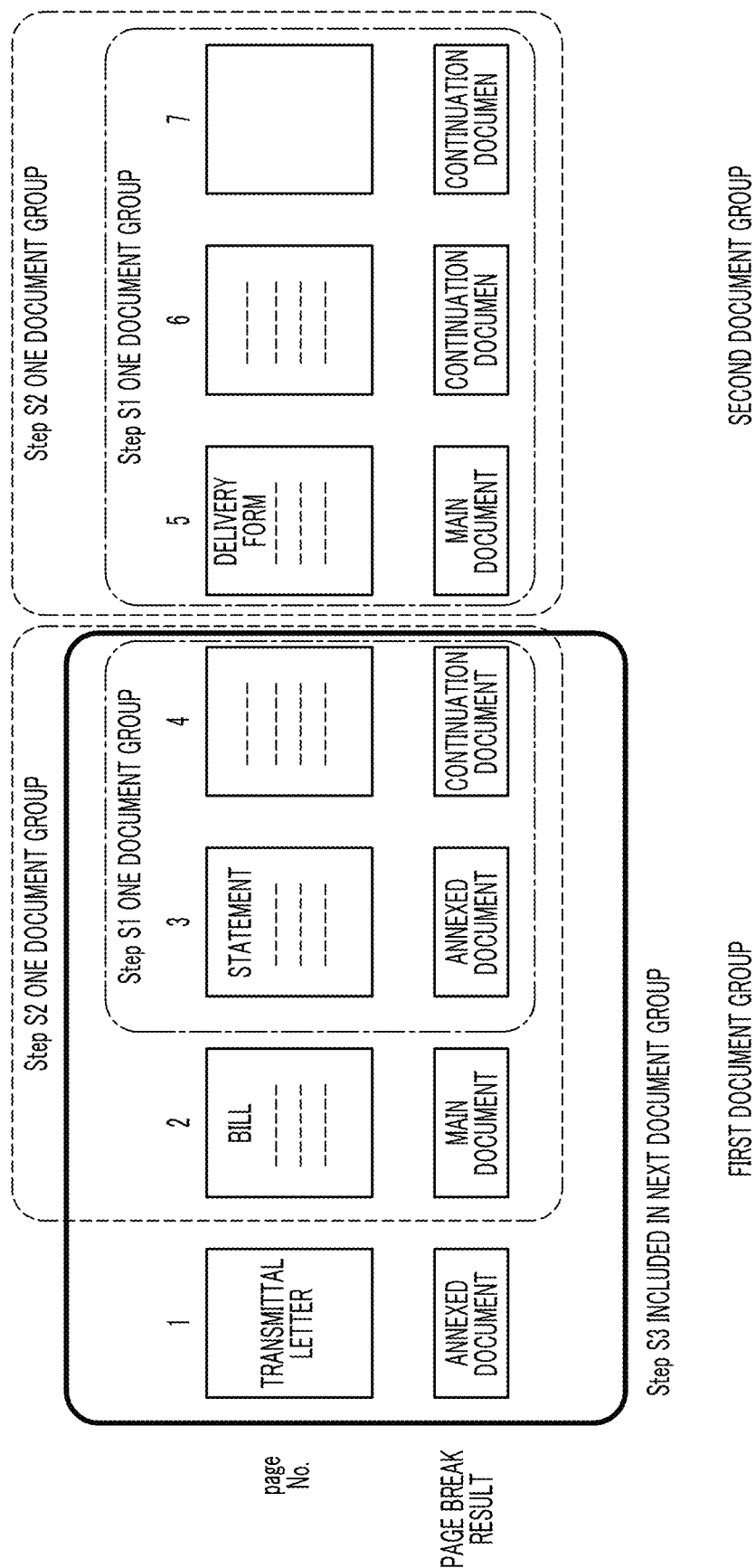
FIG. 10 is a diagram illustrating a flow of performing division by a document dividing unit in the workflow support apparatus according to the exemplary embodiment of the invention.

The document dividing unit 50 divides the documents classified by the document classifying unit 44 to be collected as a document group. Firstly, as Step S1, a document break page is created in a state where the continuation document is set to be a document having an identical type to the main document or the annexed document that appears before the page. In the example illustrated in FIG. 10, the page break is performed such that the "continuation document" being the fourth page is set to be the "annexed document" which is identical to the "annexed document" being the third page. The page break is performed such that the "continuation document" being the sixth page and the seventh page is set to be the "annexed document" which is identical to the "annexed document" being the fifth page. With the above description, in Step S1, the pages are divided into the first page, the second page, the third and fourth pages, and the fifth to seventh pages.

Then, as Step S2, the annexed document following the main document is set to one document group. In the example illustrated in FIG. 10, the pages are divided such that the "main document" being the second page and the "annexed document" being the third and fourth pages following the second page are set to be a first document group, and the "main document" being the fifth page and the "annexed document" being the sixth and seventh pages following the fifth page are set to be a second document group.

As Step S3, an annexed document which does not belong to the document group obtained by division in Step S2 is included in a document group immediately after the annexed document. In the example illustrated in FIG. 10, the "annexed document" being the first page is included in the first document group.

Figure 11:
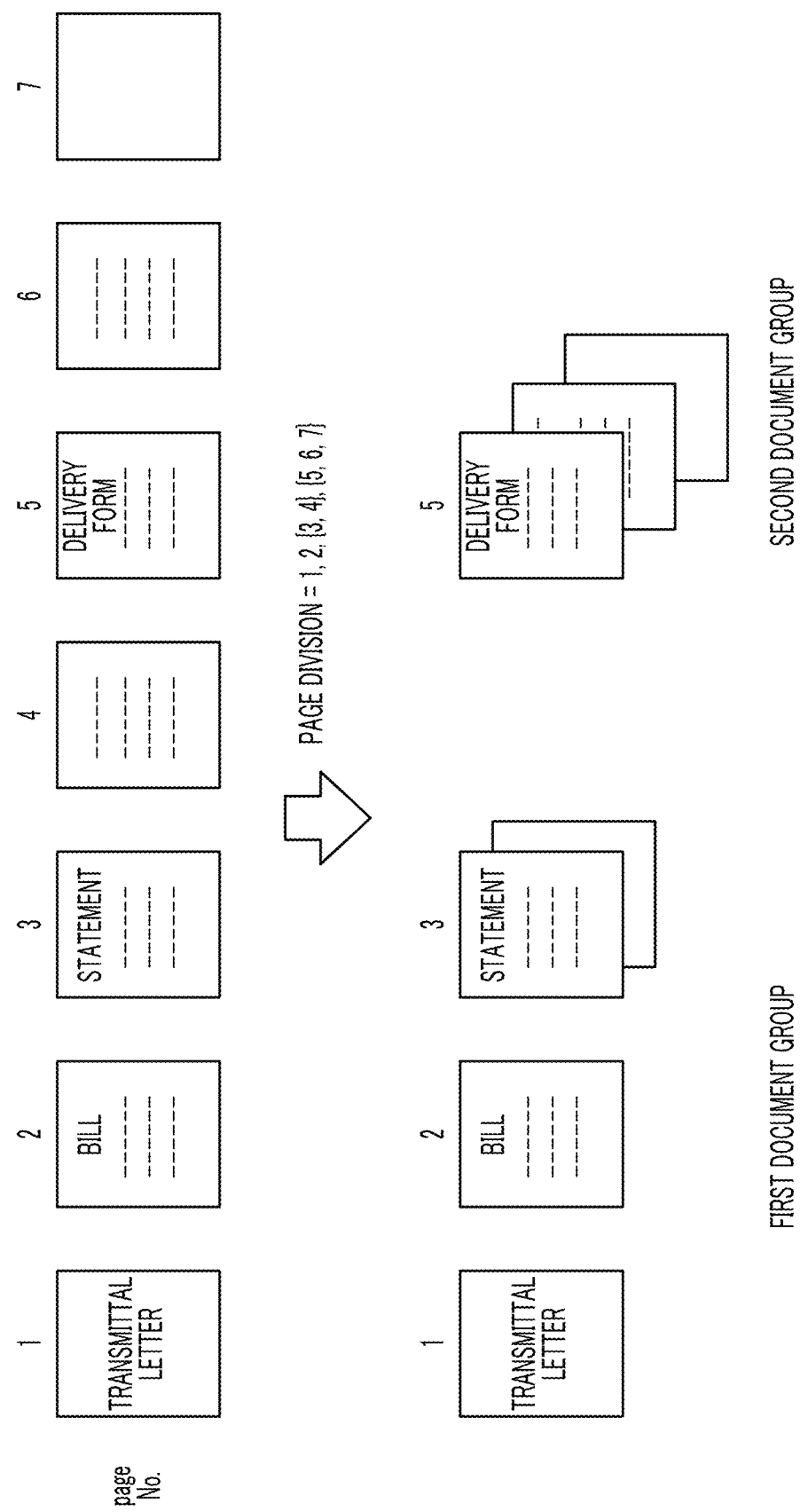
FIG. 11 is a diagram illustrating a result obtained by division of the document dividing unit in the workflow support apparatus according to the exemplary embodiment of the invention.

With the above processing, as illustrated in FIG. 11, documents from the first page to the seventh page are collectively divided into the first document group of the first page to the fourth page and the second document group of the fifth page to the seventh page.

In the exemplary embodiment, classification into the main document and the annexed document is performed, and then division of the document group is performed. However, as illustrated in FIGS. 4A and 4B, in a case where the common delivery number is assigned to the delivery note 37 and the statement 38, the delivery note 37 and the statement 38 may be determined to be one document group based on the delivery number.

A workflow registration unit 52 selects a workflow which is created in advance and causes a workflow storage unit 54 to store the selected workflow. A display data generation unit 56 is connected to the workflow registration unit 52. A workflow registration screen generated by the display data generation unit 56 is transmitted to the personal computers 14 and 14, and the workflow is registered from the workflow registration screen.

Figure 12:
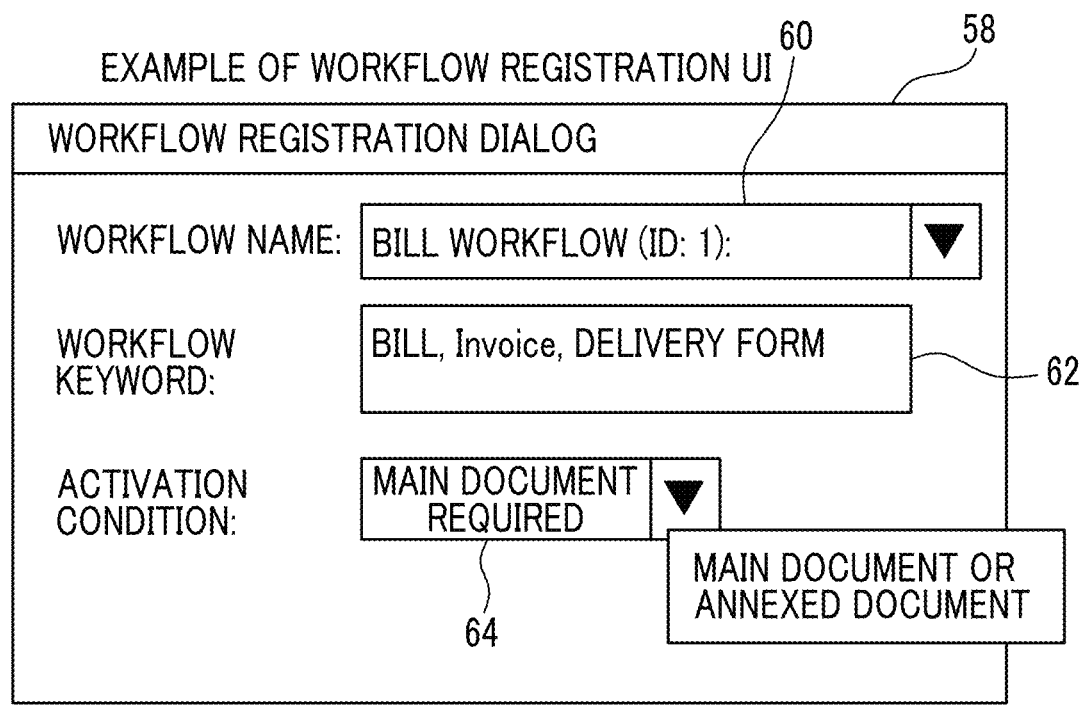
FIG. 12 is a screen diagram illustrating a workflow registration screen output by the workflow support apparatus according to the exemplary embodiment of the invention.

FIG. 12 illustrates an example of a workflow registration screen 58. A workflow name registration input portion 60, a workflow search keyword input portion 62, and an activation condition input portion 64 are provided on the workflow registration screen 58. A workflow to be registered is selected from workflows which are created in advance, at the workflow name registration input portion 60. A workflow name and an identifier (referred to as an ID) are assigned to the workflow which is created in advance. In the example illustrated in FIG. 12, a bill workflow (ID: 1) is provided. A keyword for searching for a workflow described later is input at the workflow search keyword input portion 62. In the example illustrated in FIG. 12, a bill, an Invoice, and a receipt are provided. A condition in a case where the workflow selected with the keyword is automatically activated is input at the activation condition input portion 64. In the example illustrated in FIG. 12, "main document required" or "main document or annexed document" is selected. In a case where "main document required" is selected, the workflow is automatically activated in a case where the main document is included in the document group obtained by division of the above-described document dividing unit 50, and the automatic activation is prohibited in a case where the main document is not included. In a case where "main document or annexed document" is selected, the workflow is automatically activated in a case where the main document or the annexed document is included in the document group, and the automatic activation is prohibited in a case where neither the main document nor the annexed document is not included.

In addition, in a case where "main document and annexed document required" is set as the activation condition, the workflow may be automatically activated only in a case where the main document and the annexed document are included in the document group. An option "others" may be provided, and, for example, whether or not the numerical character allowed to be recognized as the amount of money is provided in a text string analyzed by the image analyzing unit 36 or whether or not the name of a component allowed to be considered as a delivered matter is included in the text string analyzed by the image analyzing unit 36 may be set as the activation condition. Further, prohibition of automatic activation may be set, for example, in a case where "a company name is not included in the main document" or in a case where "the main document is a receipt, and an employee name is not included".

A workflow registered by the workflow registration unit 52 is stored and managed in the workflow storage unit 54. FIG. 13 illustrates an example of a workflow list managed by the workflow storage unit 54. For example, a workflow having a workflow identifier of 1 is a workflow having a workflow name of a billing process. The workflow search keyword is "bill" and "Invoice", the approver is the superior, the activation condition is "main document required", and the amount of money is provided as other activation condition.

A workflow having a workflow identifier of 4 is a workflow having a workflow name which has not been input yet.

A workflow searching unit 66 searches for a workflow stored and managed in the workflow storage unit 54. For example, the workflow searching unit 66 scores all workflows scored in the workflow storage unit 54 in accordance with a workflow activation score table 68 in which conformity between a set of characteristic words in all pages constituting one document group and the workflow search keyword is set in advance. The workflow searching unit 66 selects a workflow having the highest score. For example, as illustrated in FIG. 14, the workflow activation score table 68 is set for the text size, the text color, and the document classification. Regarding the text size, the size of 20 points or more is set to 10 points, and the size less than 20 points is set to 5 points. Regarding the text color, 7 points are set in a case where a color other than black is provided, and 5 points are set in a case of black. Regarding the document classification, 10 points are set in a case where the characteristic word is included in the main document, and 3 points are set in a case where the characteristic word is included in the annexed document.

Figure 16:
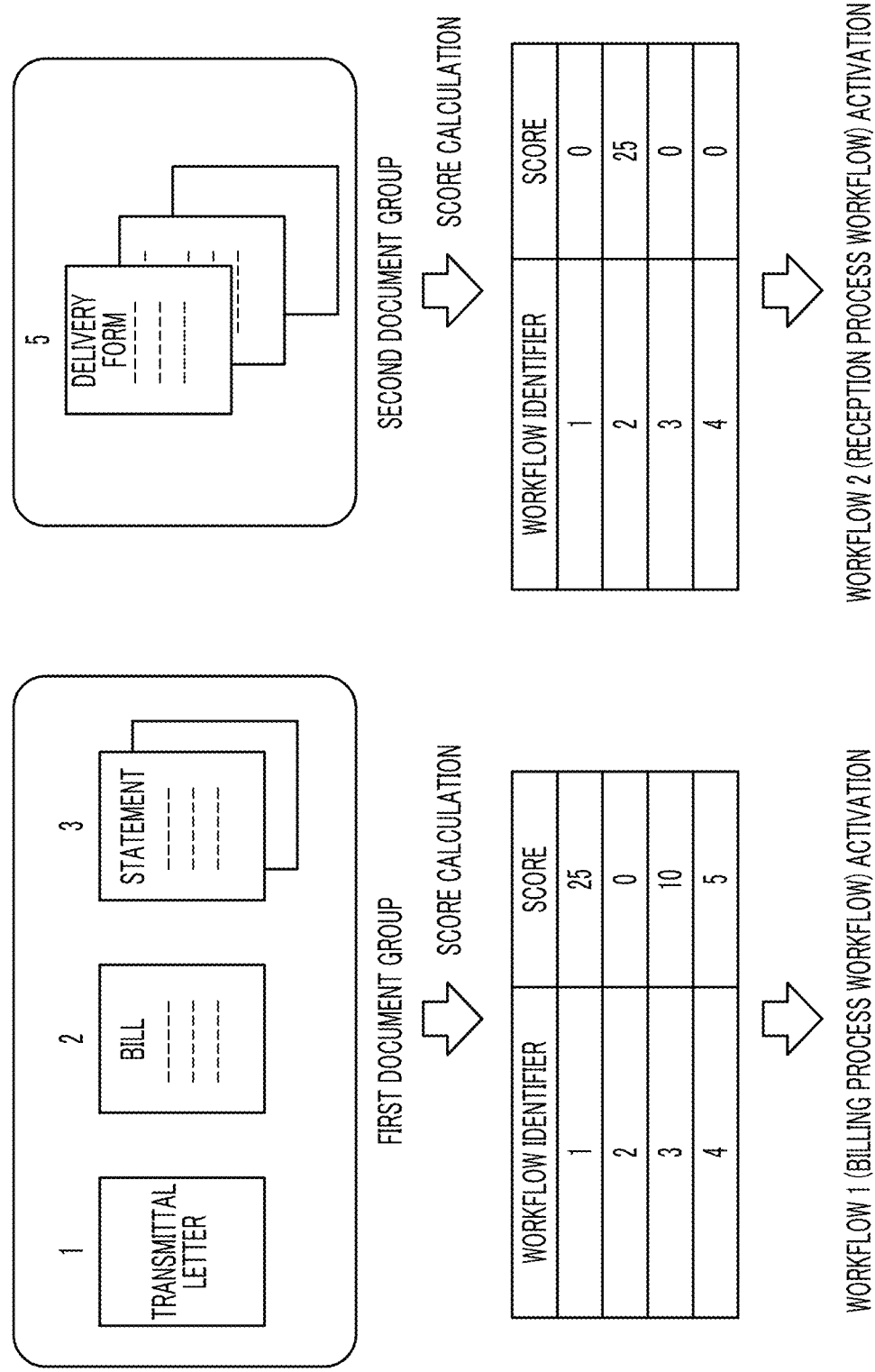
FIG. 16 is a diagram illustrating a flow in which a workflow control unit activates the workflow from the results obtained by scoring the workflow with the workflow activation score table used in the workflow searching unit of the workflow support apparatus according to the exemplary embodiment of the invention.

FIGS. 15 and 16 illustrate score accumulation results. In a case where the characteristic word "bill" in the first document group is set with 20 points and a black color in the main document, in a bill workflow having a first identifier of 1, the workflow search keyword "bill" matches with the characteristic word "bill". In the bill workflow having a first identifier of 1, 10 (text size: 20 points or more)+5 (text color: black)+10 (provided in the main document), that is, 25 points are obtained. Thus, the bill workflow having an identifier of 1 has the highest score. Thus, the first document group is to be attached to the bill workflow having an identifier of 1. In a receipt workflow having an identifier of 2, in a case where the characteristic word "receipt" included in the second document group matches with the workflow search keyword "receipt", similarly, the receipt workflow has the highest score, and the second document group is to be attached to the receipt workflow having an identifier of 2.

In the above exemplary embodiment, the workflow activation score table 68 is obtained by scoring in accordance with the text size, the text color, and the document classification which are predetermined. However, the workflow activation score table 68 may be obtained by scoring by machine learning. That is, the learning unit 48 may be connected to the above-described workflow activation score table 68, and the learning unit 48 may receive an input of the text size, the text color, and the document classification, accumulate workflow search results as teacher data in the machine learning data storage unit 49, and determine a workflow from the accumulated pieces of data.

The workflow control unit 70 determines a workflow from a search result of the workflow searching unit 66 and activates the workflow to which the corresponding document group is annexed. That is, the bill workflow having the first identifier of 1 is activated for the first document group, and the receipt workflow having an identifier of 2 is activated for the second document group. In a case where the activation condition is not satisfied, the workflow control unit 70 turns the workflow into a pending state and allows the workflow to be manually activated by a user (may be a person who performs registration) who performs a reading operation.

Figure 17:
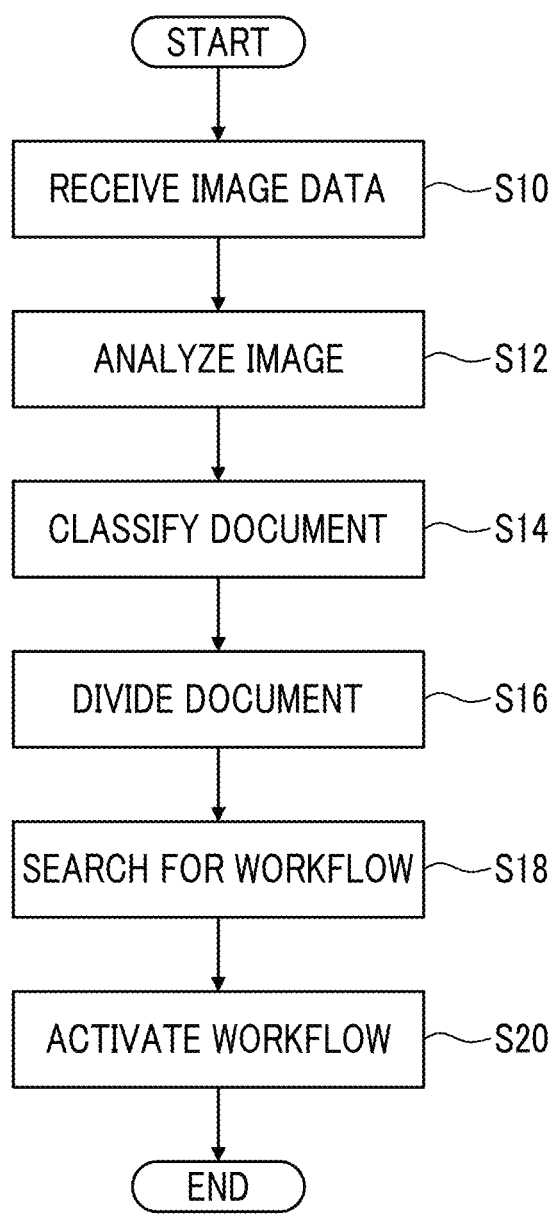
FIG. 17 is a flowchart illustrating an overall flow of the workflow support apparatus according to the exemplary embodiment of the invention.

FIG. 17 is a flowchart illustrating an overall processing flow of the workflow support apparatus.

Firstly, in Step S10, an image of a document read by the image reading device 20 in the image forming apparatus 16 is received. In Step S12, the received image of the document is analyzed to extract a text string. In Step S14, the document is classified for each page. In Step S16, the classified pages are collectively divided into document groups. In Step S18, a workflow to attach the document group is searched for. In Step S20, the searched document is activated.

Figure 18:
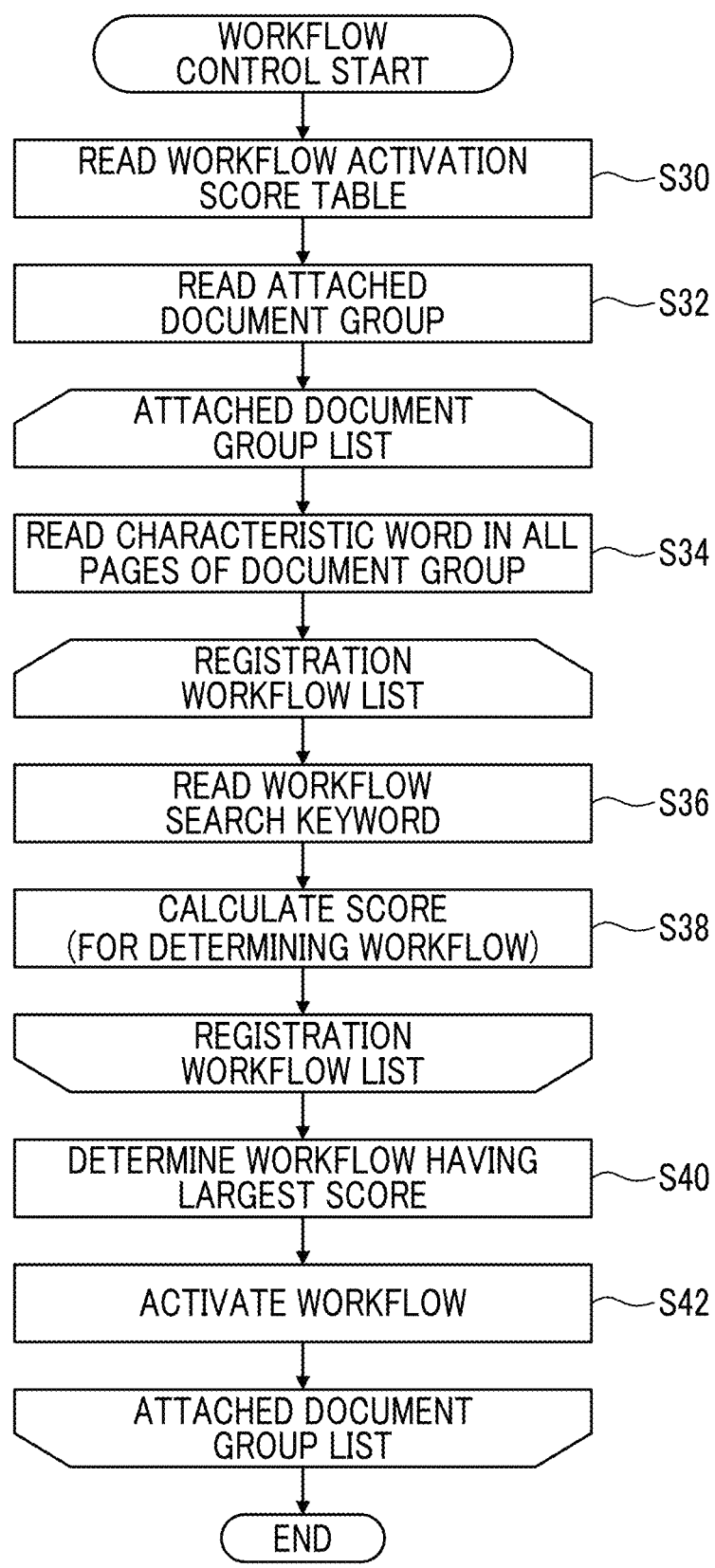
FIG. 18 is a flowchart illustrating a control flow from search of a workflow to activation of the workflow in the workflow support apparatus according to the exemplary embodiment of the invention.

FIG. 18 is a flowchart illustrating a flow of processing until the workflow is activated.

Firstly, in Step S30, the workflow activation score table 68 is read. In Step S32, the document group is read.

In Step S34, characteristic words in all pages in first one document group in a document group list are read. In Step S36, the workflow search keyword is read. In Step S38, a score for the first one workflow in a registration workflow list is calculated. In a case where the process of Step S38 is ended, the process returns to Step S36, and the workflow search keyword is read. Then, in Step S38, a score for the next workflow is calculated. The processes of Step S36 and Step S38 are performed until searching for all workflows is ended.

Ina case where searching for all the workflows is ended, the process proceeds to Step S40. In Step S40, a workflow having the largest score is determined. In Step S42, the workflow determined in Step S40 is activated. In Step S42, in a case where one workflow is activated, the process returns to Step S34, and characteristic words in all pages in the next document group are read. Similarly, the workflow is searched for, and the workflow is activated by a search result.

Satisfying the activation condition illustrated in FIG. 13 is desired in order to activate the workflow. In a case where the activation condition is satisfied, the check step of the person who performs registration is skipped, and the workflow is activated. For example, the activation condition may not be satisfied by erroneous recognition of OCR in the image analyzing unit 36. In this case, the check step of the person who performs registration is performed.

FIG. 19 illustrates a workflow attachment document wait screen 72 which is generated by the display data generation unit 56 for the check step and is displayed in the personal computers 14 and 14. In the example in FIG. 17, it may be determined that the main document is not attached. The main document is not attached, but two documents are attached. In a case where anyone document is selected, the name (text string at a portion at which a title is provided), a file name, the full text of OCR, and the like are displayed. The person who performs registration checks the above data, and adds a document further or selects a workflow to perform attachment by correcting the text string. Then, the person who performs registration presses a "complete" button, and thus the workflow may be activated.

In the exemplary embodiment, one workflow is activated by the type of one document group. However, the workflow may be selected by the contents of one document group. For example, in a case of a bill, another workflow may be activated in a case where the billed amount is equal to or larger than a predetermined amount of money. The workflow may be distinguished by instances (a series of business tasks and events that actually occur in accordance with a specific workflow template).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A workflow support apparatus comprising:
   a processor, configured to:
   receive image data from a scanner that reads an original document;
   perform optical character recognition on the image data to generate a recognized result;
   classify each page of the image data into a plurality of document groups according to the recognized result; and
   search for a workflow for each of the document groups, wherein a first document group among the document groups corresponds to a first workflow, and wherein a second document group among the document groups corresponds to a second workflow.

2. The workflow support apparatus according to claim 1, wherein the processor classifies the each page into a main document and an annexed document.

3. The workflow support apparatus according to claim 2, wherein the processor performs classification into the main document and the annexed document based on an extraction text string extracted from the image data.

4. The workflow support apparatus according to claim 3, wherein the processor classifies the each page by determining whether or not the extraction text string extracted from the image data includes a predetermined classification keyword.

5. The workflow support apparatus according to claim 4, wherein the processor classifies the each page by determining whether or not a characteristic word which includes the predetermined classification keyword and satisfies a predetermined selection condition is included in the extraction text string.

6. The workflow support apparatus according to claim 5, wherein the processor classifies the each page by determining whether or not a characteristic word satisfying a predetermined selection condition for a size and a color of a text string is included in the extraction text string.

7. The workflow support apparatus according to claim 2, wherein the processor classifies the each page by a classification condition obtained by learning from an extraction text string and a document classification result.

8. The workflow support apparatus according to claim 3, wherein the processor classifies the each page by a classification condition obtained by learning from the extraction text string and a document classification result.

9. The workflow support apparatus according to claim 1, wherein the processor classifies the each page by a classification condition obtained by learning from an extraction text string and a document classification result.

10. The workflow support apparatus according to claim 1, wherein the processor is further configured to:
    divide the classified pages to collect related documents into the document groups.

11. The workflow support apparatus according to claim 10, wherein the processor searches for the workflow by determining whether or not an extraction text string extracted from each of the document groups includes a predetermined workflow search keyword.

12. The workflow support apparatus according to claim 10,
wherein the processor searches for the workflow by evaluating an extraction text string including a workflow search keyword by a predetermined condition.

13. The workflow support apparatus according to claim 10,
wherein the processor searches for the workflow by a search condition obtained by learning from an extraction text string, a document classification result, and a workflow search result.

14. The workflow support apparatus according to claim 1, wherein the processor is further configured to:
activate the first workflow for each page of the image data classified as the first document group; and
activate the second workflow for each page of the image data classified as the second document group.

15. A workflow support system comprising:
a scanner that reads an original document;
a processor, configured to:
receive image data from the scanner that reads the original document;
perform optical character recognition on the image data to generate a recognized result;
classify each page of the image data into a plurality of document groups according to the recognized result; and
search for a workflow for each of the document groups, wherein a first document group among the document groups corresponds to a first workflow, and wherein a second document group among the document groups corresponds to a second workflow.

16. A non-transitory computer readable medium storing a program causing a computer to perform:
receiving image data from a scanner that reads an original document;
performing optical character recognition on the image data to generate a recognized result;
classifying each page of the image data into a plurality of document groups according to the recognized result; and
searching for a workflow for each of the document groups, wherein a first document group among the document groups corresponds to a first workflow, and wherein a second document group among the document groups corresponds to a second workflow.

\* \* \* \* \*